United States Patent
Sumiya et al.

(10) Patent No.: US 7,770,835 B2
(45) Date of Patent: *Aug. 10, 2010

(54) RECORDING TAPE CARTRIDGE

(75) Inventors: Yosuke Sumiya, Kanagawa (JP); Kenji Takenoshita, Kanagawa (JP); Shozo Onmori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/382,555

(22) Filed: Mar. 18, 2009

(65) Prior Publication Data

US 2009/0242681 A1 Oct. 1, 2009

(30) Foreign Application Priority Data

Mar. 31, 2008 (JP) .............................. 2008-091000

(51) Int. Cl.
*G11B 23/107* (2006.01)

(52) U.S. Cl. .................... 242/348; 242/332.4; 360/132

(58) Field of Classification Search .................. 242/347, 242/348, 348.1, 332.4; 360/132
See application file for complete search history.

(56) References Cited

U.S. PATENT DOCUMENTS

| | | | |
|---|---|---|---|
| 5,218,342 A | 6/1993 | McCrackin | |
| 6,160,679 A * | 12/2000 | Maekawa et al. | 360/132 |
| 6,651,917 B2 * | 11/2003 | Momoi et al. | 242/348 |
| 6,702,215 B2 * | 3/2004 | Stamm et al. | 242/348 |
| 6,824,320 B1 * | 11/2004 | Kerr et al. | 242/348 |
| 7,227,721 B1 * | 6/2007 | Kientz et al. | 360/132 |
| 2002/0047063 A1 * | 4/2002 | Kaneda et al. | 242/348 |
| 2002/0175240 A1 * | 11/2002 | Kitamura et al. | 242/348 |
| 2002/0179763 A1 * | 12/2002 | Tsuyuki et al. | 242/348 |
| 2004/0007639 A1 | 1/2004 | Hiraguchi | |
| 2006/0180694 A1 * | 8/2006 | Battles et al. | 242/348 |
| 2007/0058290 A1 | 3/2007 | Tada et al. | |
| 2007/0177304 A1 | 8/2007 | Onmori et al. | |

FOREIGN PATENT DOCUMENTS

JP 10-172263 6/1998

* cited by examiner

*Primary Examiner*—William A Rivera
(74) *Attorney, Agent, or Firm*—Jean C. Edwards, Esq.; Akerman Senterfitt

(57) ABSTRACT

A recording tape cartridge comprises: a case that comprises an upper case and a lower case and houses a reel around which recording tape is wound; a regulating wall that is formed at least on the lower case and defines an area in which the reel is housed; a holding wall that is formed a predetermined space away from an outer peripheral surface of the regulating wall; and an RFID that is housed in the space between the regulating wall and the holding wall.

13 Claims, 10 Drawing Sheets

RECORDING TAPE CARTRIDGE

CROSS-REFERENCE TO RELATED APPLICATION

This application claims priority under 35 USC 119 from Japanese Patent Application No. 2008-091000, filed Mar. 31, 2008, the disclosure of which is incorporated by reference herein.

BACKGROUND OF THE INVENTION

1. Field of the Invention

The present invention relates to a recording tape cartridge where recording tape such as recording tape that is used as a recording and reproducing medium mainly for computers and the like is housed inside a case.

2. Description of the Related Art

Conventionally, there have been known recording tape cartridges where recording tape such as magnetic tape that is used as a data recording and reproducing medium (data backup) for computers and the like is wound around a reel that is made of a synthetic resin and where the reel is singly housed inside a case. Sometimes a non-contact memory board, in which various information such as the recording capacity and the recording format of the recording tape is stored, is housed in this one-reel type recording tape cartridge, and the memory board is configured to be accessible by a dedicated reading and writing device that is disposed in a drive device or a library device.

Meanwhile, conventionally, there has also been proposed two-reel type video cassettes where, in contrast to the memory board, a non-contact IC (integrated circuit) tag (RFID) that is accessible by a common (inexpensive) reading and writing device is disposed on a back label side (e.g., see Japanese Patent Application Laid-Open Publication (JP-A) No. 10-172263). It is necessary to form the length of the antenna of the IC tag long in order to extend the communication distance of the IC tag, and therefore the IC tag is formed in a certain size (area). In the case of a two-reel type video cassette, attaching the IC tag can be done easily because the area on the back label side thereof is large.

However, in the case of a one-reel type recording tape cartridge, the size of the entire one-reel type recording tape cartridge is about half the size of a two-reel type video cassette, so the size of the back label side thereof is also about half, and it becomes difficult to attach the IC tag to the back label side. Further, when the IC tag is adhered by an adhesive to the inside of the case, there arises the problem that rotation of the reel is hindered by the IC tag when the IC tag peels off inside the housing area of the reel as a result of degradation over time (a drop in the durability) of the adhesive. In this manner, there is the problem that, when an IC tag that has a certain size (area) is to be attached to the inside of a case of a recording tape cartridge, it is difficult to ensure an attachment region for the IC tag.

SUMMARY OF THE INVENTION

Thus, the present invention provides a recording tape cartridge that can ensure an attachment region for an RFID (Radio Frequency Identification) inside a case.

A recording tape cartridge pertaining to an aspect of the invention includes: a case that has an upper case and a lower case and houses a reel around which recording tape is wound; a regulating wall that is formed at least on the lower case and defines an area in which the reel is housed; a holding wall that is formed a predetermined space away from an outer peripheral surface of the regulating wall; and an RFID that is housed in the space between the regulating wall and the holding wall.

According to the recording tape cartridge pertaining to this aspect of the invention, the RFID can be disposed between the regulating wall that defines the housing area of the reel and the holding wall that is formed the predetermined space away from the outer peripheral surface of the regulating wall. In other words, thus, an attachment region for the RFID can be ensured inside the case.

Further, in the recording tape cartridge pertaining to the above-described aspect of the invention, the regulating wall may be formed in a planar view substantially circular arc shape, and the holding wall may be formed in a planar view substantially circular arc shape that is configured to have substantially the same curvature as that of the regulating wall.

According to the recording tape cartridge of this configuration, the RFID can be disposed along the planar view substantially circular arc-shaped regulating wall that defines the housing area of the reel.

Further, in the recording tape cartridge pertaining to the above-described aspect of the invention, a receiving portion that receives an integrated circuit or IC portion of the RFID may be formed in the holding wall.

According to the recording tape cartridge of this configuration, even when the IC portion of the RFID projects, the RFID can be disposed between the regulating wall that defines the housing area of the reel and the holding wall that is formed the predetermined distance away from the outer peripheral surface of the regulating wall.

Further, in the recording tape cartridge pertaining to the above-described aspect of the invention, the regulating wall may be formed in a planar view substantially circular arc shape, and the holding wall may be configured by plural ribs that are formed on a circumference that is configured to have substantially the same curvature as that of the regulating wall.

According to the recording tape cartridge of this configuration, the RFID can be disposed along the planar view substantially circular arc-shaped regulating wall that defines the housing area of the reel.

Further, in the recording tape cartridge pertaining to the above-described aspect of the invention, the height of the holding wall may be lower than the height of the regulating wall.

According to the recording tape cartridge of this configuration, disposing the RFID between the regulating wall that defines the housing area of the reel and the holding wall that is formed the predetermined distance away from the outer peripheral surface of the regulating wall can be done easily by a robot hand or the like.

As described above, according to the present invention, there can be provided a recording tape cartridge where an attachment region for an RFID can be ensured inside a case.

DETAILED DESCRIPTION OF THE INVENTION

Figure 1:
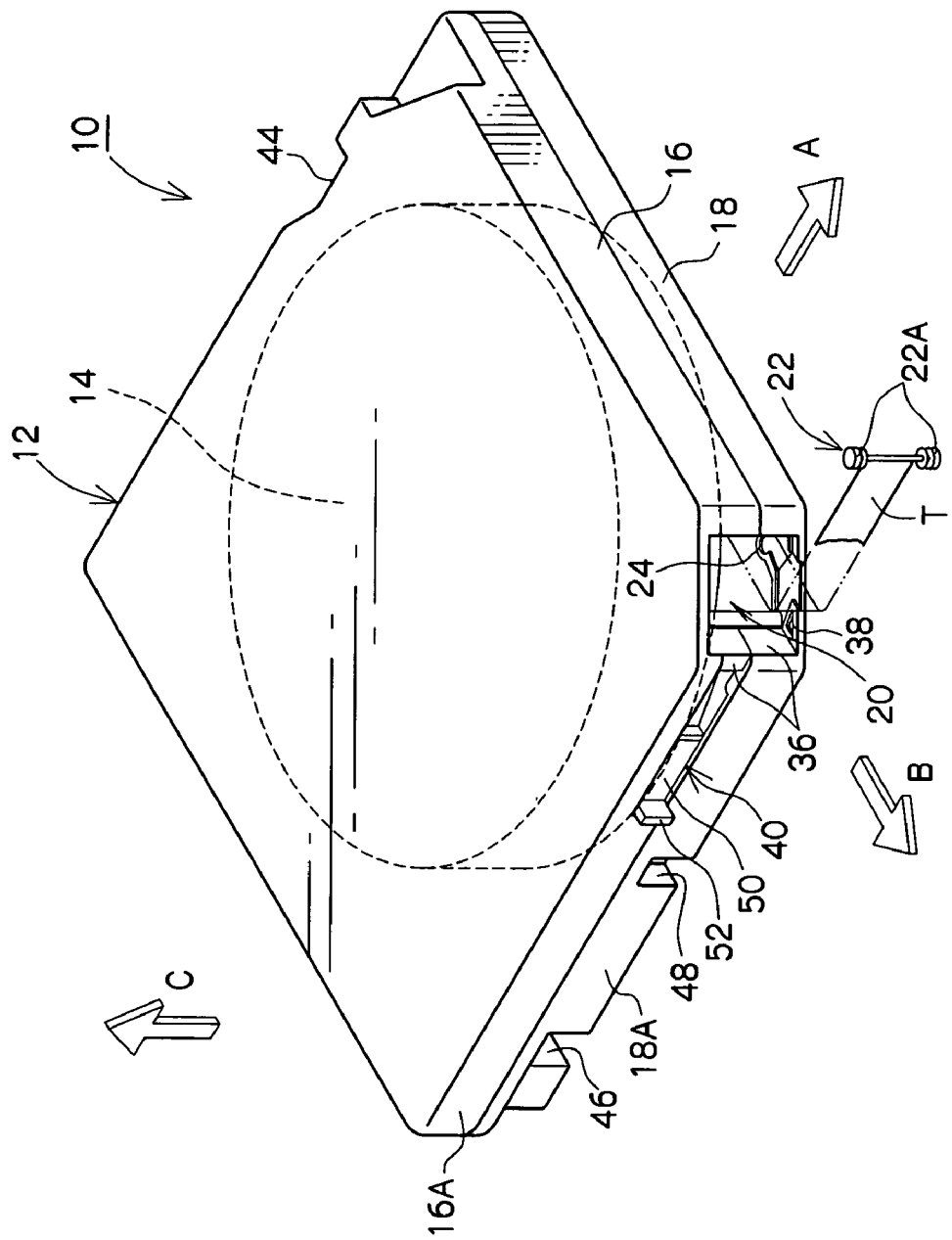
FIG. 1 is a general perspective view of a recording tape cartridge.

Below, the best modes for implementing the present invention will be described in detail on the basis of embodiments shown in the drawings. For the sake of convenience of description, in FIG. 1, arrow A represents the direction in which a recording tape cartridge 10 is loaded into a drive device (not shown) and will be referred to as a front direction (front side) of the recording tape cartridge 10. Additionally, the direction of arrow B, which is orthogonal to arrow A, will be referred to as a right direction (right side). Further, arrow C represents a direction that is orthogonal to the direction of arrow A and the direction of arrow B and will be referred to as an upper direction (upper side) of the recording tape cartridge 10.

As shown in FIG. 1 to FIG. 4, the recording tape cartridge 10 is configured such that a reel 14, around which is wound recording tape T such as magnetic tape that is an information recording and reproducing medium, is rotatably and singly housed inside a case 12 that is configured to have a substantially rectangular shape when seen in a planar view. The case 12 is configured as a result of a peripheral wall 16A of an upper case 16 and a peripheral wall 18A of a lower case 18 being brought into contact with each other to join together the upper case 16 and the lower case 18 whose right front corner portions, which are one corner portion on a leading side of the recording tape cartridge 10 in the direction in which the recording tape cartridge 10 is loaded into the drive device, have been diagonally cut out, and a housing space that houses the reel 14 is formed inside the case 12.

Further, the cutout corner portions of the peripheral walls 16A and 18A of the upper case 16 and the lower case 18 are configured as an opening 20 for allowing the recording tape T to be pulled out, and a leader pin 22 that is locked (engaged) and pulled out by pullout means (not shown) of the drive device is connected to a free end of the recording tape T that is pulled out from this opening 20. Annular grooves 22A are formed in both end portions of the leader pin 22 that project from the width direction edges of the recording tape T, and hooks or the like of the pullout means lock into these annular grooves 22A. Thus, the hooks or the like do not contact and damage the recording tape T when the pullout means pulls out the recording tape T.

Further, a pair of upper and lower pin holding portions 24 that position and hold the leader pin 22 inside the case 12 is disposed inside the opening 20 in the case 12. The pin holding portions 24 have substantially semicylindrical shapes and are configured such that both end portions of the leader pin 22 in an upright state are held inside recessed portions 24A of the pin holding portions 24. It will be noted that the recording tape T pullout sides of the pin holding portions 24 are open and serve as entries and exits that the leader pin 22 enters and from which the leader pin 22 exits.

Further, a plate spring 25 is fixedly disposed in the vicinity of the pin holding portions 24 as a result of its base portion being inserted into groove portions 23 and spring holding portions 27 that are disposed in the inner surface of a front wall 12A (portions of the outer surfaces of the peripheral walls 16A and 18A that face the direction of arrow A), and a two-pronged distal end portion of the plate spring 25 is configured to engage with the upper and lower ends of the leader pin 22 and hold the leader pin 22 in the pin holding portions 24. It will be noted that the distal end portion of the plate spring 25 is configured to appropriately elastically deform to allow movement of the leader pin 22 when the leader pin 22 enters and exits the pin holding portions 24.

Moreover, a gear opening 26 for exposing a reel gear (not shown) of the reel 14 to the outside is disposed in the center portion of the lower case 18, and the reel 14 is driven to rotate inside the case 12 as a result of the reel gear meshing with a drive gear (not shown) of the drive device. Further, the area in which the reel 14 is housed is defined by a (planar view substantially circular arc-shaped) play regulating wall (regulating wall) 28 that is respectively partially disposed on, so as to project from, the inner surfaces of the upper case 16 and the lower case 18 and is on a circular locus (on a circumference) that is coaxial with the gear opening 26. Additionally, the reel 14 is housed on the inner side of the play regulating wall 28 and is held so as to not rattle.

Further, in the lower case 18, a pocket portion 28A, inside of which is formed a position regulating hole, is disposed consecutively with the end portion of the play regulating wall 28 in the vicinity of the opening 20. On the inner side of the left front corner portion of the lower case 18, a pocket portion 29, inside of which is formed a position regulating hole that is an elongate hole, is disposed away from the play regulating wall 28. The pocket portions 28A and 29 are disposed on a straight line along the direction of arrow B, and areas around the position regulating holes on the undersurface side of the lower case 18 (portions that have the same thickness as, or are slightly wider than, the pocket portions 28A and 29) are configured as reference surfaces for positioning with respect to the drive device.

Additionally, the play regulating wall 28 of the lower case 18 partitions the inside of the case 12 into areas on the outer side of the play regulating wall 28 and a housing area (housing space) of the reel 14 as a result of its end portions, excluding the end portion where the pocket portion 28A is consecutively disposed, being disposed consecutively with the peripheral wall 18A. Further, the play regulating wall 28 of the upper case 16 also similarly (in vertical symmetry) partitions the inside of the case 12 into areas on the outer side of the play regulating wall 28 and a housing area (housing space) of the reel 14 as a result of its end portions being disposed consecutively with the peripheral wall 16A.

Figure 4:
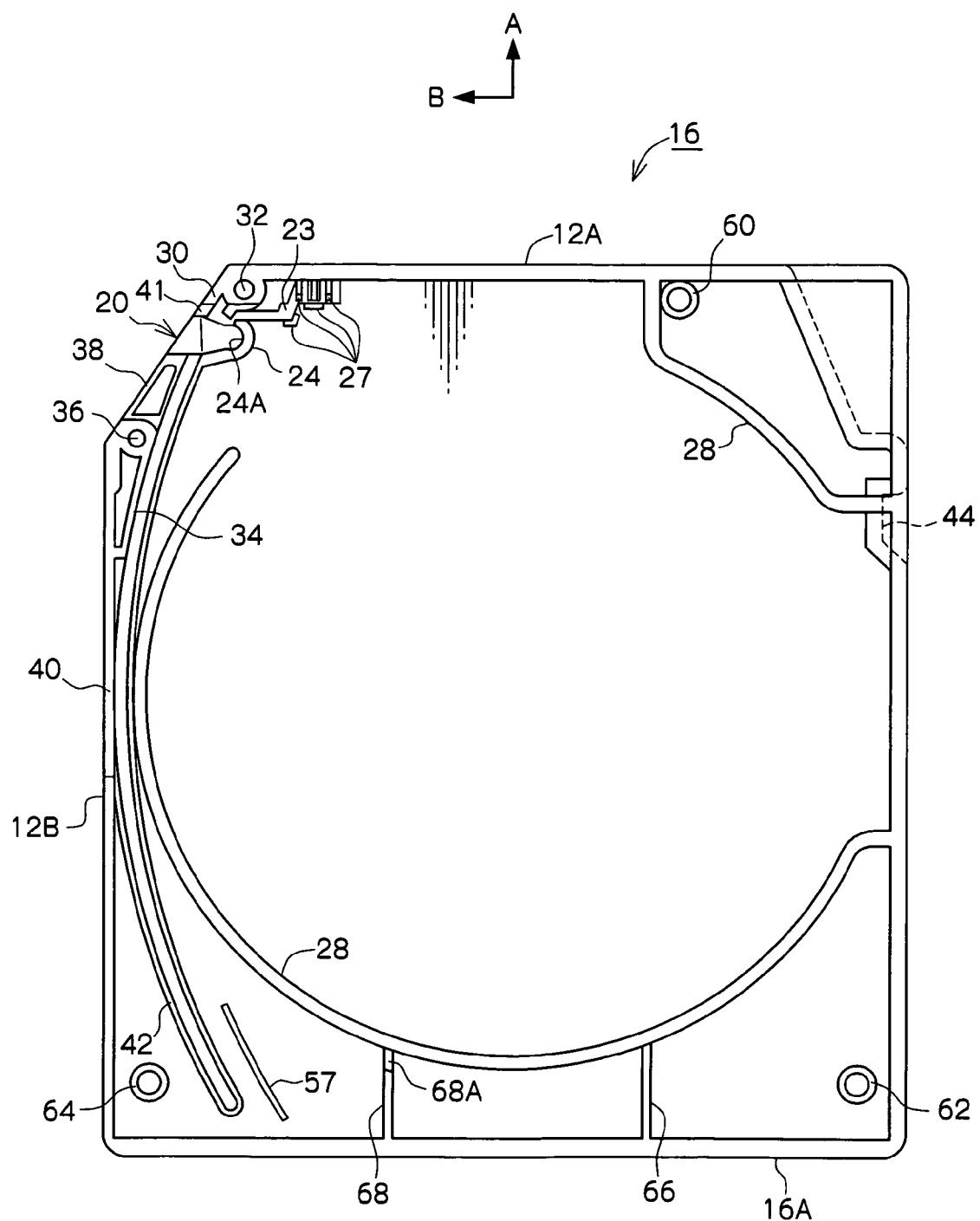
FIG. 4 is a general bottom view of an upper case.
Figure 5:
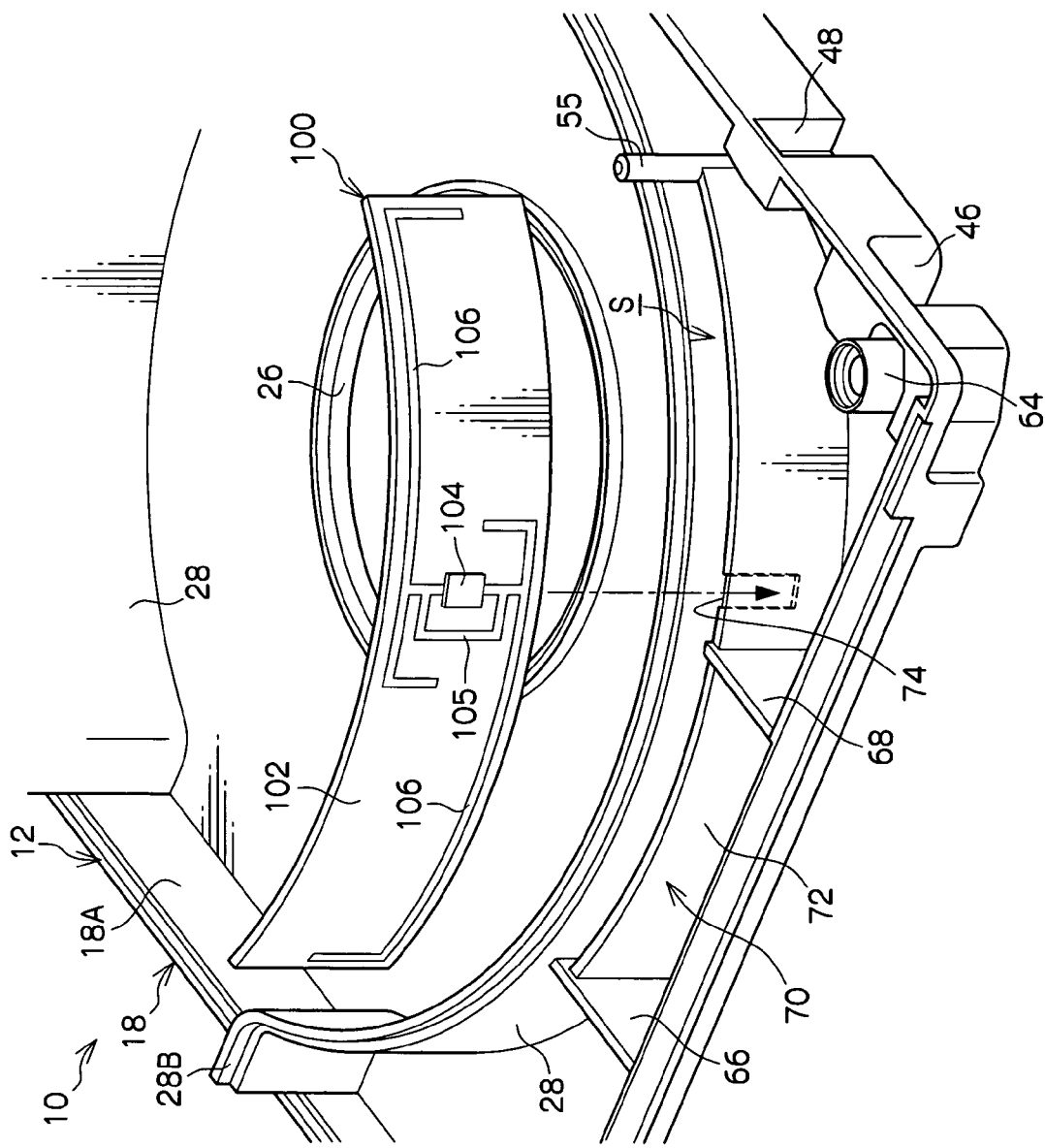
FIG. 5 is a general perspective view showing a holding structure before an IC tag is housed therein.
Figure 6:
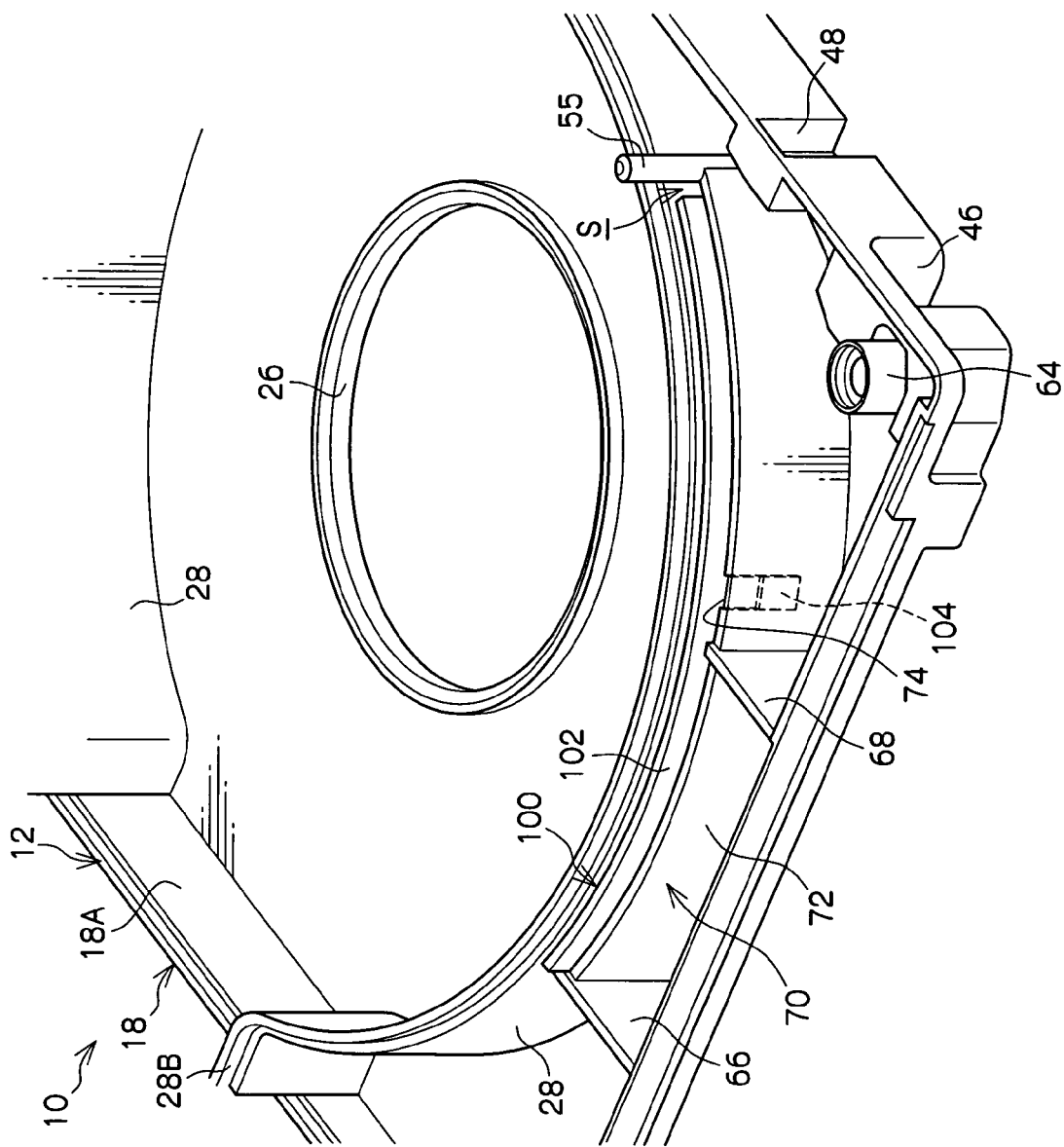
FIG. 6 is a general perspective view showing the holding structure after the IC tag has been housed therein.
Figure 7:
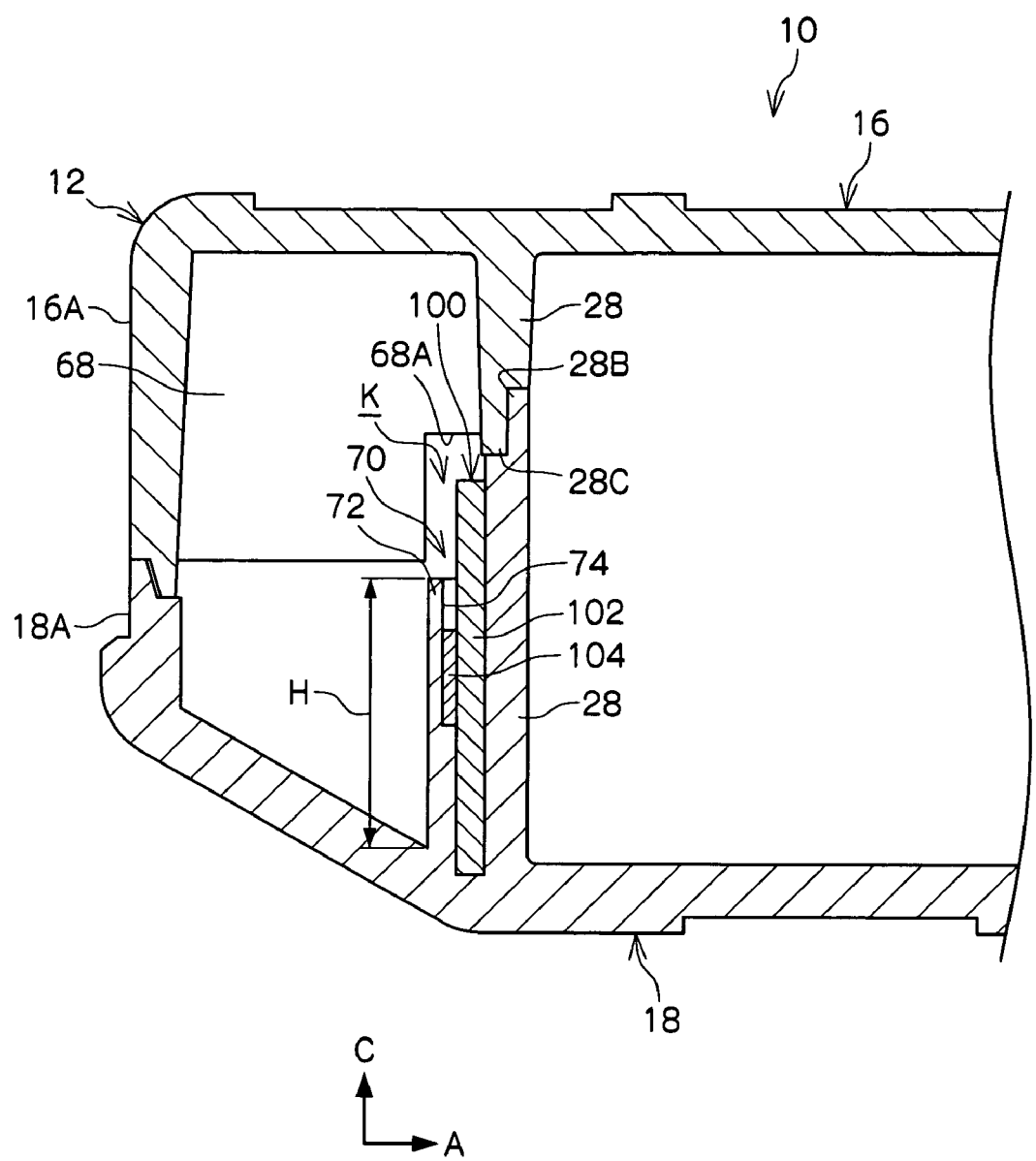
FIG. 7 is a general cross-sectional view showing the holding structure after the IC tag has been housed therein.

Moreover, as shown in FIG. 5 to FIG. 7 (not shown in FIG. 2 to FIG. 4), a step portion 28B that projects upward is formed on the inner peripheral surface side of the radial direction substantial center portion of the upper end surface of the play regulating wall 28 of the lower case 18, and a step portion 28C that projects downward is formed on the outer peripheral surface side of the radial direction substantial center portion of the lower end surface of the play regulating wall 28 of the upper case 16.

Consequently, when the upper case 16 has been joined together with the lower case 18, the step portion 28C of the play regulating wall 28 of the upper case 16 and the step portion 28B of the play regulating wall 28 of the lower case 18 engage with each other, and a labyrinth structure is formed at the engagement site. In other words, thus, the ingression of dust or the like into the housing area of the reel 14 is deterred (dust-proofness is ensured), and the strength of the case 12 itself is also improved.

Figure 2:
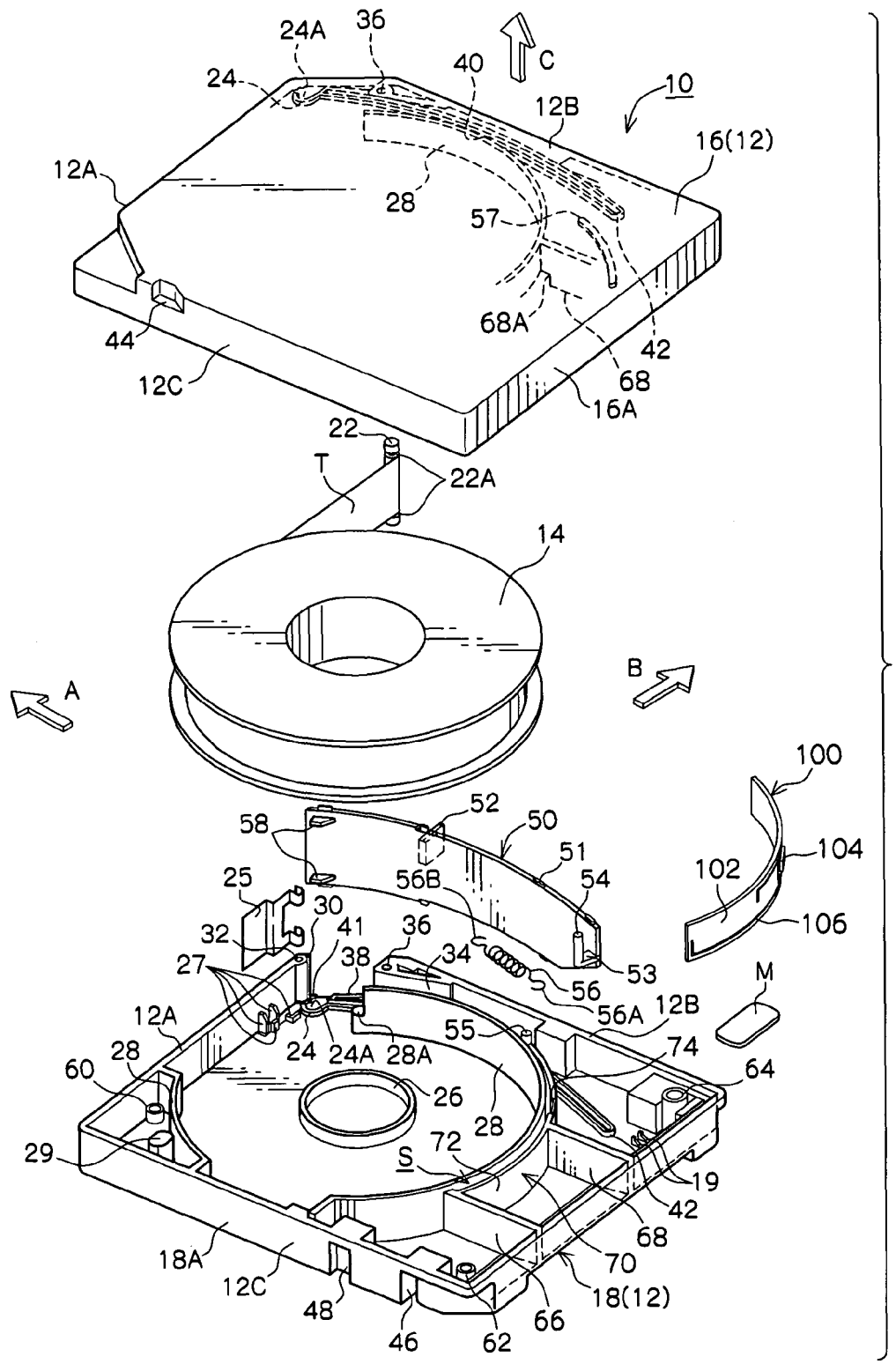
FIG. 2 is a general exploded perspective view of the recording tape cartridge.
Figure 3:
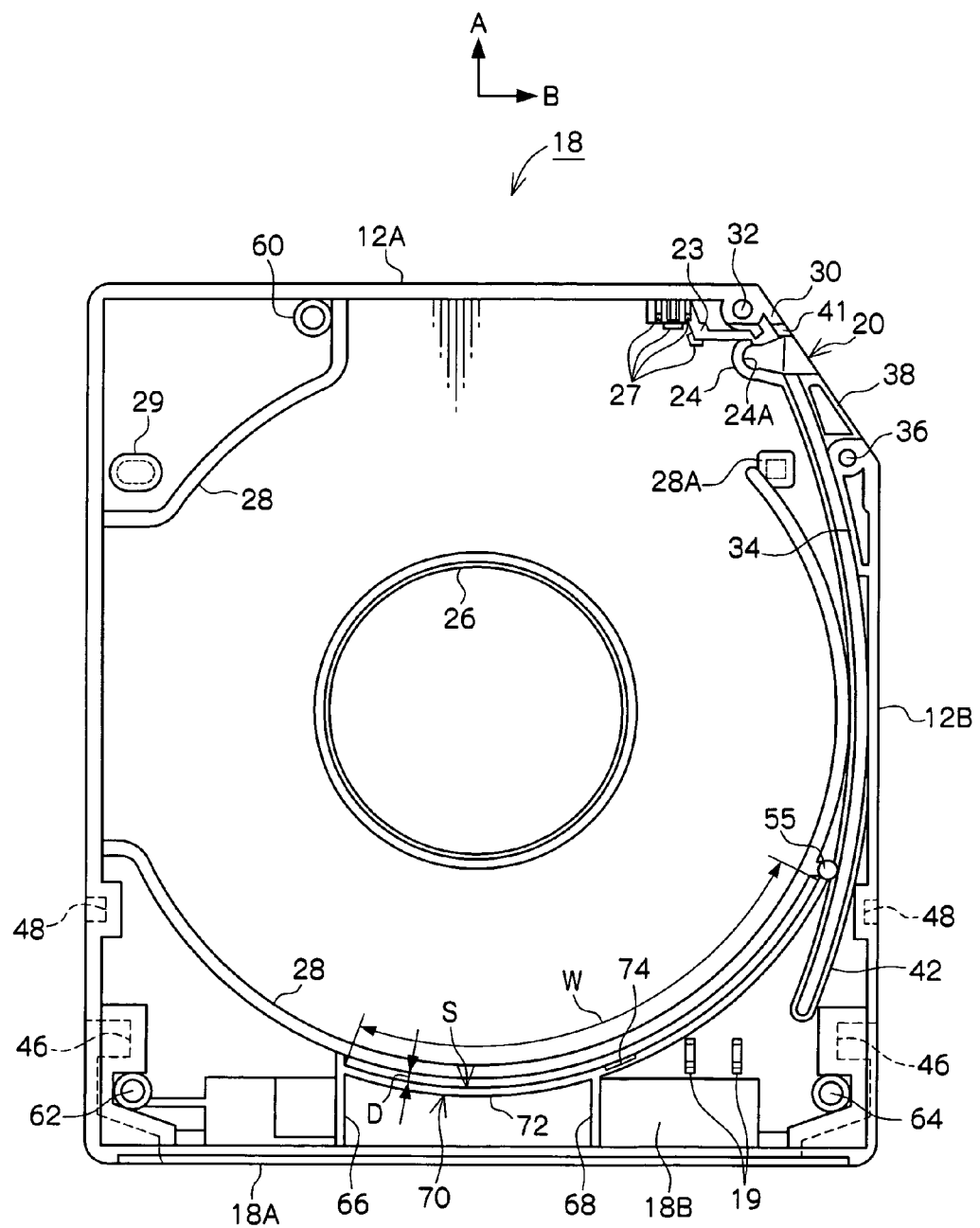
FIG. 3 is a general plan view of a lower case.

Further, as shown in FIG. 2 and FIG. 3, in the lower case 18, the peripheral wall 18A and the outer peripheral surface of the play regulating wall 28 on the rear side of the case 12 are integrally interconnected by a connecting rib 66, and the peripheral wall 18A and the outer peripheral surface of a later-described holding wall 72 are integrally interconnected by a connecting rib 68. The connecting ribs 66 and 68 are both formed in flat plate shapes whose longitudinal direction is the front-rear direction of the case 12, and the connecting rib 66 and the connecting rib 68 are formed a predetermined distance away from each other in the left-right direction.

Further, connecting ribs 66 and 68 are also similarly formed on the upper case 16. That is, as shown in FIG. 4, in the upper case 16, the peripheral wall 16A and the outer peripheral surface of the play regulating wall 28 on the rear side of the case 12 are integrally interconnected by the connecting ribs 66 and 68. It will be noted that the upper case 16 shown in FIG. 4 is a bottom view, so left and right are reversed (in vertical symmetry) from the planar view of the lower case 18 shown in FIG. 3. Further, the holding wall 72 is not formed on the upper case 16, so the connecting rib 68 of the upper case 16 is, similar to the connecting rib 66, disposed consecutively with the outer peripheral surface of the play regulating wall 28.

Additionally, a step portion 68A that is capable of receiving a later-described IC tag 100 and the holding wall 72 (to ensure that the connecting rib 68 of the upper case 16 does not contact the IC tag 100 and the holding wall 72) when the upper case 16 has been joined together with the lower case 18 is formed at least in the front side (the play regulating wall 28 side) of the connecting rib 68 of the connecting ribs 66 and 68 of the upper case 16 (see FIG. 7).

Further, a screw boss 60 that forms a vertical pair with a screw boss 60 on the upper case 16 is disposed in a predetermined position between the front wall 12A and the play regulating wall 28 on the side where the pocket portion 29 is disposed, and screw bosses 62 and 64 that form vertical pairs with screw bosses 62 and 64 on the upper case 16 are also disposed in predetermined positions in both corner portions between both the left and right end portions of a rear portion inner surface 18B of the lower case 18 and a left wall 12C and a right wall 12B. These vertical pairs of screw bosses 60, 62 and 64 penetrate the lower case 18 but do not penetrate the upper case 16.

Further, a pair of upper and lower short slanted wall portions 30 that define the front edge portion of the opening 20 is disposed on the right end portion of the front wall 12A of the case 12. The slanted wall portions 30 are formed so as to bend along the open surface of the opening 20 and become dust-proof walls to ensure that a gap through which dust or the like can ingress does not arise when the leading end of a later-described planar view substantially circular arc-shaped door 50 enters the inner sides of the slanted wall portions 30 when the door 50 closes off the opening 20. Additionally, a pair of upper and lower screw bosses 32 is disposed consecutively with the inner side of the front wall 12A in the vicinity of the left sides of the slanted wall portions 30.

Further, a pair of upper and lower slanted wall portions 34 of shapes that substantially follow the outer peripheral surface of the later-described door 50 when seen in a planar view is disposed on the inner side of the front end portion of the right wall 12B (portions of the outer surfaces of the peripheral walls 16A and 18A that face the direction of arrow B) of the case 12. The front end surfaces of the slanted wall portions 34 define the rear edge of the opening 20, and a pair of upper and lower screw bosses 36 is disposed in the front end portions thereof.

Further, a slit 40 of a predetermined length that serves as a window portion that allows the inside and the outside of the case 12 to be communicated with each other is disposed in the right wall 12B of the case 12, and the slit 40 is configured to expose an operation projection 52 of the later-described door 50. The slit 40 is formed by cutting out the front side lower portion of the peripheral wall 16A of the upper case 16 that configures the right wall 12B, and the slit 40 opens toward the opening 20. It is preferable for the slit 40 to be formed such that some of the peripheral wall 16A remains on the upper side in this manner, because the rigidity of the case 12 can be maintained. It is particularly preferable for the wall on the upper side that defines the slit 40 to be integrally disposed consecutively from the slanted wall portion 34.

Further, a recessed portion 48 whose portion excluding the upper end of the peripheral wall 18A is recessed inward of the case 12 and is also recessed upward from the undersurface of the case 12 (the bottom plate is cut out) in a cross-sectional view substantial "U" shape is formed toward the rear side of the lower case 18. This recessed portion 48 is, for example, configured as an engagement portion with which pull-in means (not shown) of the drive device engages, and the bottom surface (the surface that faces down) of the recessed portion 48 is configured as a reference surface for positioning inside the drive device.

Further, a recessed portion 46 whose portion excluding the upper end of the peripheral wall 18A is recessed inward of the case 12 and is also recessed upward from the undersurface of the case 12 (the bottom plate is cut out) in a cross-sectional view substantial "U" shape is also formed on the rear side of the recessed portion 48. This recessed portion 46 is, for example, configured as an engagement portion with which gripping means (not shown) of a library device engages, and the torsional strength of the case 12 (the lower case 18) is improved by disposing these recessed portions 46 and 48.

Further, a planar view substantially trapezoidal recessed portion 44 is formed in the upper surface portion of the left wall of the upper case 16. The recessed portion 44 is configured as an engagement portion with which a holding member (not shown) that is disposed in the drive device engages in order to cancel the rotational moment that accompanies movement in the opening direction of the door 50 when the door 50 opens the opening 20.

Further, in the upper case 16 and in the lower case 18, guide wall portions 42 of a predetermined height (e.g., a height of about 1.0 mm to about 1.5 mm) that support tongue portions 51 of the later-described door 50 so as to sandwich the tongue portions 51 from both their inner surface sides and their outer surface sides are disposed upright from the vicinity of the opening 20 to the vicinity of the site where the play regulating wall 28 comes closest to the right wall 12B (called "front halves" below) and from the vicinity of the rear end of the slit 40 to the vicinity of the rear wall (called "rear halves" below).

The lengths of these guide wall portions 42 differ between the upper case 16 and the lower case 18, with the rear half of the guide wall portion 42 of the upper case 16 being longer than the rear half of the guide wall portion 42 of the lower case 18. This is because a later-described memory board M is disposed on the right wall 12B side of the rear portion inner surface 18B of the lower case 18. Further, the rear end portions of the rear halves of the guide wall portions 42 are closed off in planar view substantially circular arc shapes and respectively regulate the rearmost tongue portions 51 above and below such that the door 50 cannot move any further rearward.

The front end portions of the front halves of the guide wall portions 42 are open, and the front halves of the guide wall portions 42 are disposed so as to extend as far as positions where they do not hinder the entering and exiting of the leader pin 22 when the leader pin 22 enters and exits (the positions shown in the drawings are on the rear side of the pin holding portions 24 and are about half of the opening width of the opening 20). Further, guide wall portions 41 whose rear end portions are open are also disposed upright in the vicinity of the slanted wall portions 30 so as to be positioned on extension lines of the guide wall portions 42. The guide wall portions 41 are configured to not extend rearward beyond the front ends of the pin holding portions 24 such that the rear end portions of the guide wall portions 41 do not hinder the entering and exiting of the leader pin 22, and the door 50 is configured to close off the opening 20 in a state where the leading end of the door 50 has entered the guide wall portions 41.

Further, the guide wall portions 41 and the front halves of the guide wall portions 42 are formed so as to be slightly lower than the rear halves of the guide wall portions 42. That is, for example, the height of the guide wall portions 41 and the front halves of the guide wall portions 42 is formed to be about 1 mm, and the height of the rear halves of the guide wall portions 42 is formed to be about 1.5 mm. This is to ensure space for the pullout means that is disposed in the drive device to enter the opening 20. Consequently, as described later, the plate width (height) of the front half portion of the door 50 (at least the portion that closes off the opening 20) is formed so as to be larger (higher) in correspondence to the guide wall portions 41 and the front halves of the guide wall portions 42 being low.

Moreover, ribs 38 that are integrated with the outer side guide wall portions 42 exposed from the opening 20 and have planar view substantially trapezoidal shapes are disposed upright on the inner surface of the upper case 16 and on the inner surface of the lower case 18 so as to become the same height as the guide wall portions 42, and the strength of the upper case 16 and the lower case 18 at the portion of the opening 20 is ensured by the ribs 38. It will be noted that, although the inner side guide wall portions 42 are disposed consecutively so as to become integrated with the pin holding portions 24, it is desirable for the height of the pin holding portions 24 to be formed at substantially the same height or higher than the height of the guide wall portions 42 that are integrally consecutively disposed.

The upper case 16 and the lower case 18 that have been described above are fixed (joined together) as a result of unillustrated screws being screwed from below into the screw bosses 32 and 36 that are positioned in the vicinity of the edge portions of the opening 20 and into the above-described screw bosses 60, 62 and 64. Thus, the corner portions of both ends of the opening 20, which are defined particularly by the free ends of the slanted wall portions 30 (the front wall 12A) and the slanted wall portions 34 (the right wall 12B) and which are disadvantaged in terms of strength and which easily impact with the ground or the like as a result of the case 12 being dropped, are strongly joined together so that, even if the case 12 is dropped, the corner portions of both ends of the opening 20 do not deform, buckle or shift positions under the weight of the entire recording tape cartridge 10.

Further, the opening 20 is configured to be opened and closed by the door 50 that serves as a shield member. The plate width (height) of at least the portion of the door 50 that closes off the opening 20 is formed so as to be substantially the same as the opening height of the opening 20, the plate width (height) of the rear side of the door 50 is formed so as to be slightly smaller (lower), and the plate length of the door 50 is formed so as to be sufficiently larger than the opening width of the opening 20. Additionally, the door 50 is formed in a planar view substantially circular arc shape that is curved in its plate thickness direction such that the door 50 can move along a predetermined circumference.

The door 50 is configured to close off the opening 20 in a state where the leading end portion of the door 50 has entered the guide wall portions 41, slide (rotate) substantially rearward along the predetermined circumference to open the opening 20, and completely open the opening 20 when the outer peripheral surface in the vicinity of the leading end of the door 50 reaches the vicinity of the screw bosses 36. Additionally, the door is configured to close off the opening 20 by sliding (rotating) in the opposite direction of the direction when the door 50 opens the opening 20.

In this manner, the door 50 is formed so as to curve in a circular arc shape that corresponds to the predetermined circumference that is the movement locus of the door 50, and the center of rotation of the door 50 is, in the present embodiment, set such that its position in the left-right direction is in the vicinity of the left end of the case 12 and such that its position in the front-rear direction is in the vicinity of the rear end of the slit 40. Thus, the movement locus of the door 50 comes closest to the right wall 12B of the case 12 in the vicinity of the rear end of the slit 40. It will be noted that it suffices for the rotational center and the radius of the door 50 to be determined in response to the positions of the front and rear edge portions (the slanted wall portions 30 and the screw bosses 36) of the opening 20 that are determined by demand from the drive device and the angle of the open surface of the opening 20 that is determined by demand from the library device.

Further, the curved longitudinal dimension of the door 50 is determined such that the rear end portion of the door 50 is positioned inside the right rear corner portion of the case 12 behind the recessed portion 48 (in the vicinity of the recessed portion 46) in a state where the opening 20 is closed off, and the rear lower portion of the door 50 is diagonally cut out in order to avoid the memory board M that is diagonally disposed at a predetermined angle θ by later-described position regulating ribs 19. It will be noted that it is preferable for at least one of the inner surface and the outer surface of the front end portion of the door 50 to be formed as a tapered surface so that the door can smoothly enter between the guide wall portions 41.

Further, the upper surface and the lower surface of the door 50 respectively contact guide surfaces (inner surfaces that face each other) of the guide wall portions 42 and the inner surface of the upper case 16 and the inner surface of the lower case 18 between the guide wall portions 42, and the tongue portions 51 that guide the door 50 in the directions in which the door 50 opens and closes the opening 20 are disposed on, so as to project from, the door 50. The tongue portions 51 are formed in planar view substantially elliptical shapes that are long along the longitudinal direction of the door 50, and the tongue portions 51 are disposed on, so as to project from, the door 50 such that there are four of the tongue portions 51 each on the upper surface and the lower surface of the door 50 in vertical symmetry excluding the rearmost tongue portions 51 and such that the tongue portions 51 have substantially the same height as the height of the guide wall portions 42 (e.g., the height of the tongue portions 51 on the front side of the boundary portion where the plate widths of the door 50 differ is about 0.5 mm, and the height of the tongue portions 51 on the rear side of the boundary portion where the plate widths of the door 50 differ is about 1.5 mm). It will be noted that the reason why the rearmost tongue portions 51 are not in vertical symmetry is because the rear lower portion of the door 50 is diagonally cut out.

When the tongue portions 51 are disposed, sliding resistance (friction) between the door 50 and the inner surface of the upper case 16 and the inner surface of the lower case 18 between the guide wall portions 41 and the guide wall portions 42 and also between the door 50 and the guide surfaces of the guide wall portions 41 and the guide wall portions 42 can be reduced, and it becomes possible to allow the door 50 to slide smoothly with little resistance. Moreover, when the tongue portions 51 are formed in planar view substantially elliptical shapes, the tongue portions 51 have much better impact-resistance than when, for example, the tongue portions 51 are formed in planar view substantially circular shapes. Consequently, there is no fear that the tongue portions 51 will break even when a force is imparted to the door 50 from outside of the opening and closing direction due to an impact such as a drop.

Further, the operation projection 52 that serves as an operation portion is disposed on, so as to project along the radial direction of the door 50 from, the outer peripheral surface of the door 50 that is slightly in front of the longitudinal direction center portion of the door 50 (in the vicinity of the boundary portion where the plate widths of the door 50 differ). The operation projection 52 is configured to be exposed to the outer side of the case 12 from the slit 40, is positioned slightly away from the rear ends of the screw bosses 36 in a state where the opening 20 is closed off, and is configured to be operable from the portion that is open toward the front of the slit 40.

Additionally, in a state where the opening 20 is open, the operation projection 52 is positioned slightly away from the rear edge of the slit 40, and, at this time, the rearmost tongue portions 51 contact the closed-off rear end portions of the guide wall portions 42. It will be noted that, although the inside and the outside of the case 12 are communicated with each other by the slit 40 for exposing the operation projection 52, this slit 40 is always substantially closed off by the screw bosses 36 and the door 50 that spans substantially the entire height of the inside of the case 12, and the play regulating wall 28 that serves as an inner wall is disposed inside the case 12, so the adhesion of dust or the like to the recording tape T that is wound around the reel 14 is prevented.

Further, stoppers 58 that contact the side surface of the upper end portion and the side surface of the lower end portion of the leader pin 22 when the door 50 closes off the opening 20 are disposed on, so as to project from, the inner surface of the front end portion of the door 50, and thus the leader pin 22 can be prevented even more from coming out of the pin holding portions 24 because of a drop impact or the like. Additionally, a coil spring 56 that serves as an urging member that urges the door 50 in the direction in which the door 50 closes off the opening 20 is disposed effectively utilizing the space in the right rear corner portion of the case 12 between the play regulating wall 28 and the right wall 12B (the peripheral walls 16A and 18A) because the door 50 has a length that extends to the right rear corner portion of the case 12 in a state where the opening 20 is closed off.

That is, a plate-shaped support portion 53 is integrally disposed on, so as to be consecutive with, the inner peripheral surface of the door 50 in the vicinity of the rear end of the door 50, a spring holding portion 54 is integrally disposed on, so as to project upward from, the upper surface of the support portion 53, and a cylindrical spring locking portion 55 is disposed on, so as to project upward from, the inner surface of the lower case 18 in the vicinity of the recessed portion 48. Additionally, ring-shaped attachment portions 56A and 56B are respectively formed on both ends of the coil spring 56. Consequently, the coil spring 56 can be easily attached inside the above-described space by inserting the one attachment portion 56B from above over the spring locking portion 55 and inserting the other attachment portion 56A from above over the spring holding portion 54.

Further, a rib 57, which the upper end of the spring holding portion 54 slidingly contacts when the door 50 opens and closes, is disposed upright in a planar view substantially circular arc shape on the inner surface of the upper case 16. This rib 57 is disposed in a position and with a length such that the upper end of the spring holding portion 54 can slidingly contact the rib 57 at least when the door 50 begins to move (open), and the rib 57 ensures that the door 50 is more stably opened by suitably guiding the spring holding portion 54 that moves counter to the urging force of the coil spring 56 (so that the door 50 does not shake due to the urging force of the coil spring 56 when the door 50 opens).

Further, by disposing this rib 57, it can be ensured that the attachment portion 56A of the coil spring 56 that has been attached as described above does not come off of the spring holding portion 54 even when an impact resulting from a drop or the like is imparted to the case 12 and raises the spring holding portion 54. It will be noted that the upper end of the spring locking portion 55 also becomes inserted between the play regulating wall 28 and the guide wall portion 42 of the upper case 12, so the attachment portion 56B can be similarly prevented from coming off of the spring locking portion 55.

Further, the memory board M, in which various information such as the recording capacity and the recording format is recorded and which is accessible without contact, is disposed slanting at the predetermined angle θ (e.g., θ=45°) in the right rear portion of the lower case 18. That is, the rear portion inner surface 18B of the lower case 18 slants at the predetermined angle θ, and position regulating ribs 19 are plurally (e.g., two) disposed a predetermined distance away from each other in the left-right direction on, so as to project from, the inner surface of the lower case 18 in front of the rear portion inner surface 18B and in back of the later-described holding wall 72.

Consequently, the memory board M is disposed on the rear portion inner surface 18B, and the lower end portion of the memory board M is supported by the position regulating ribs 19, whereby the memory board M is held (so as to not slip and fall) in an orientation where the memory board M slants at the predetermined angle θ. It will be noted that it is preferable for the slanting angle θ of the rear portion inner surface 18B to be set to 45° in order to enable access from the undersurface side and the rear surface side of the case 12 with respect to the memory board M.

Further, as shown in FIG. 2 to FIG. 7, a holding structure 70 that houses and holds the later-described IC tag 100 is formed on the rear side (radial direction outer side) of the play regulating wall 28 of the lower case 18. That is, this holding structure 70 is configured by a holding wall 72 that is formed with a predetermined height H and a predetermined length W a predetermined space S away in the radial direction from the outer peripheral surface of the play regulating wall 28, and the holding wall 72 is integrally disposed on, so as to project from, the inner surface of the lower case 18 in a planar view substantially circular arc shape that is configured to have substantially the same curvature as that of the play regulating wall 28. It will be noted that the holding wall 72 may also be formed on a curve with a planar view substantially circular arc shape that has substantially the same center as that of the play regulating wall 28, so as to be a certain distance away from the play regulating wall 28 on the radial direction outer side of the play regulating wall 28.

Additionally, an IC tag 100, which serves as an RFID in which various information is capable of being stored, is capable of being housed inside the space S that is formed between the play regulating wall 28 and the holding wall 72. In other words, a radial direction width D (see FIG. 3) of the space S that is configured by the play regulating wall 28 and the holding wall 72 is configured to be slightly larger than the thickness of the IC tag 100 (a later-described base material 102) and is configured to be a size that can hold the IC tag 100 in a substantially upright state.

Figure 8:
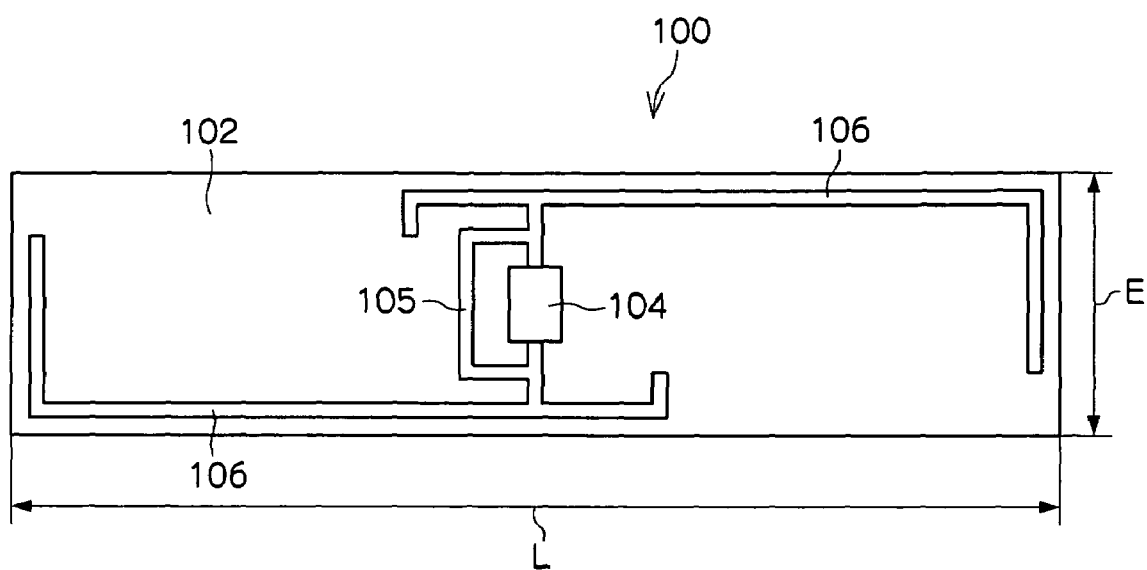
FIG. 8 is a general front view of the IC tag.

Further, the height H (see FIG. 7) of the holding wall 72 is configured to be equal to or greater than ½ of a height E (see FIG. 8) of the IC tag 100 (the later-described base material 102) and is configured to be a height that is a predetermined amount lower than the height of the play regulating wall 28. Thus, it can be ensured that the IC tag 100 does not cross over and come off of the holding wall 72, and it can be made easier for the IC tag 100 to be inserted into (put into) the inside of the space S along the play regulating wall 28 by a robot hand (not shown) or the like.

Additionally, the circumferential direction length W of the holding wall 72 is configured to be substantially the same as the length along the play regulating wall 28 from the connecting rib 66 that interconnects the play regulating wall 28 and the peripheral wall 18A to the spring locking portion 55, and is formed relatively long. It will be noted that the IC tag 100 is held as a result of being inserted into the inside of the space S and that the IC tag 100 is not adhered by adhering means such as an adhesive to the play regulating wall 28 or the holding wall 72.

The IC tag 100 is configured as a result of an IC portion 104 that is disposed with an IC chip and antenna portions (dipole antennas) 106 that are connected to the IC portion 104 being disposed on a flexible, thin plate-shaped (film-shaped) base material 102 that has a substantially rectangular shape that is capable of being housed inside the space S.

More specifically, this IC tag 100 is such that the IC portion 104 is disposed in the substantial center portion of the base material 102, the antenna portions 106 are configured by pole antennas that are disposed so as to extend from a plus side and a minus side of the IC portion 104 and become point-symmetrical, and each of the pole antennas is configured to have a length of about 75 mm, for example, in its linear dimension (when both sides are combined, the antenna portions 106 have a combined length of about 150 mm, for example).

The length of the antenna portions 106 is appropriately adjusted on consideration of the permittivity (dielectric constant) of the material (the case 12, the recording tape T, etc.) that is present in the vicinity of the antenna portions 106. For example, when only the atmosphere is present in the vicinity of the antenna portions 106, the permittivity thereof becomes 1.0 and the length of the antenna portions 106 is configured to be the above-described length. Further, for example, when the antenna portions 106 are covered by a material (a ceramic, etc.) with high permittivity (n=5 to 10), the wavelength apparently becomes shorter, so the length of the antenna portions 106 can be made shorter than the above-described length.

Incidentally, the IC tag 100 is configured to be accessible without contact by a common (inexpensive) radio communication format (e.g., a band of 900 MHz and a communication distance of 4 m or less) reading and writing device (not shown) rather than an electromagnetic (magnetic field) induction format (e.g., a band of 13.56 MHz and a communication distance of 0.6 m or less) reading and writing device (not shown) that is capable of accessing the memory board M without contact.

In other words, although it is necessary for the IC portion 104 to match the frequency of the radio waves it receives (to have a resonance frequency), the IC portion 104 is configured such that it can be accessed and reading and writing of information can be performed by a frequency (e.g., 900 MHz, which is a UHF band) that is different from that of the memory board M. Consequently, the IC portion 104 is capable of being used as antitheft means or inventory managing means such as individual uniform management of the recording tape cartridge 10 at the time of diversionary storage from a barcode label and at the time of continuous use by an auto loader, for example.

Further, the storage capacity of the IC portion 104 is configured to be 96 bits to 240 bits (12 bytes to 30 bytes), for example, and is configured to be a relatively small capacity. This is to make the IC portion 104 compact and because it is necessary to control power consumption in order to extend the communication distance. In this manner, the storage capacity of the IC portion 104 is small, but in the case of the recording tape cartridge 10 in which the memory board M is installed, the information that is to be stored can be dispersed, so the storage capacity of the IC portion 104 can be ensured so as to be capable of accommodating the degree of freedom of a user. However, it is possible to store the same information as the memory board M in the IC portion 104 as needed.

Further, the IC tag 100 that is shown is configured to be capable of accommodating both an electromagnetic (magnetic field) induction format and a radio communication format. That is, the antenna portions 106 that are connected to the IC portion 104 and project out in the longitudinal direction of the base material 102 are configured to function as radio communication format antennas, and an antenna portion 105 that is connected in a loop manner in the vicinity of the IC portion 104 is configured to function as an electromagnetic (magnetic field) induction format antenna.

Further, a longitudinal direction length L of the base material 102 of the IC tag 100 is configured to be a length that is capable of being housed inside the space S and to be a length that is as close as possible to the circumferential direction length W of the holding wall 72, and the longitudinal direction end portions of the base material 102 housed inside the space S are configured to be respectively regulated by the connecting rib 66 and the spring locking portion M. Consequently, this IC tag 100 is configured such that movement in its longitudinal direction is deterred (its position is regulated) inside the space S.

Further, as shown in FIG. 7, when the upper case 16 has been joined together with the lower case 18, the connecting rib 68 of the upper case 16 that is disposed above the holding wall 72 faces the IC tag 100 and the holding wall 72 such that there is a predetermined clearance K therebetween. That is, the step portion 68A for receiving the IC tag 100 and the holding wall 72 is, as described above, formed in the connecting rib 68 of the upper case 16, so the connecting rib 68 can deter movement of the IC tag 100 in the vertical (height) direction thereof (can regulate the position of the IC tag 100) without damaging the IC tag 100.

Further, a recessed portion 74 that serves as a receiving portion that receives the IC portion 104 of the IC tag 100 is formed at an appropriate position in the holding wall 72 (a position where the IC portion 104 of the IC tag 100 that is to be housed is disposed). That is, there are IC tags 100 of a structure where the IC portion 104 projects from the surface of the base material 102, and the recessed portion 74 that is capable of receiving that IC portion 104 is formed so that even an IC tag 100 of this kind of structure can be housed inside the space S between the play regulating wall 28 and the holding wall 72.

It will be noted that, although this recessed portion 74 may also be formed in the play regulating wall 28, it is not desirable for part of the play regulating wall 28 to project toward the reel 14 because the reel 14 is housed on the inner side of the play regulating wall 28. Consequently, it is desirable for the IC portion 104 to be housed inside the space S so as to face the outer side of the case 12, and, for this reason, the recessed portion 74 is formed in the holding wall 72. Further, because it suffices for the recessed portion to be able to receive the IC portion 104, an unillustrated cutout portion or the like may be formed in the holding wall 72 rather than the recessed portion 74.

Next, the action of the recording tape cartridge 10 of the above configuration will be described. When the recording tape cartridge 10 of the above-described configuration is not in use (during storage, during transport), the opening 20 is closed off by the door 50. Specifically, the door 50 is always urged by the urging force of the coil spring 56 in the direction in which the door 50 closes off the opening 20, and the door 50 closes off the opening 20 in a state where the leading end portion (front end portion) of the door 50 enters the guide wall portions 41 in the vicinity of the slanted wall portions 30.

A plurality of the recording tape cartridges 10 are housed in this state in a library device. Then, a reading and writing device that is disposed in an unillustrated robot hand accesses the memory boards M from the rear surface (rear wall) sides of the recording tape cartridges 10, reads the various information such as the recording capacity that is stored in the memory boards M, and transmits that information to a control device (not shown). Thus, drive devices that are most suitable to the recording tape cartridges 10 (capable of recording information in and reproducing information from the recording tape cartridges 10) are recognized beforehand by the control device.

Then, when the recording tape T is to be used, one of the recording tape cartridges 10 is taken out from the library device by the robot hand, and that recording tape cartridge 10 is loaded into a drive device along the direction of arrow A. This drive device is a drive device that has been selected as a result of the information stored in the memory board M having been read, and the recording tape cartridge 10 is loaded into the drive device smoothly and efficiently by the robot hand. Then, in accompaniment with this loading, an opening and closing member (not shown) of the drive device enters the forwardly open slit 40 and engages with the operation projection 52 of the door 50.

In this state, when the recording tape cartridge 10 (the case 12) is pushed further in the direction of arrow A, the opening and closing member causes the operation projection 52 to move rearward counter to the urging force of the coil spring 56 because of this pushing force (causes the operation projection 52 to move relatively rearward with respect to the case 12 that is loaded in the direction of arrow A). Then, the door 50 from which the operation projection 52 projects rotates in a clockwise direction when seen in a plan view along the curving direction thereof while the tongue portions 51 are guided by the guide wall portions 42.

That is, the door 50 moves substantially rearward, so as to move around the outer side of the pin holding portions 24 and the reel 14 without projecting out from the movement locus along the curving shape of the door 50 because of the guide wall portions 42, and opens the opening 20. Then, when the case 12 (the recording tape cartridge 10) is loaded a predetermined depth in the drive device, the opening 20 is completely opened, the recording tape cartridge 10 is positioned, and the reading and writing device that is disposed in the drive device accesses the memory board M from the undersurface side of the recording tape cartridge 10, reads the various information stored in the memory board M, and also writes individual information as needed.

When the recording tape cartridge 10 is positioned inside the drive device in a state where the opening 20 has been opened in this manner, further rotation (substantially rearward movement) of the door 50 is regulated, and the pullout means of the drive device enters the inside of the case 12 from the opened opening 20, extracts the leader pin 22 that is positioned and held in the pin holding portions 24, and houses the leader pin 22 in an unillustrated take-up reel. Then, the take-up reel and the reel 14 are driven to rotate synchronously, whereby the recording tape T is sequentially pulled out from the case 12 while being taken up on the take-up reel, and the recording and reproducing of information are performed by a recording and reproducing head (not shown) that is disposed along a predetermined tape path.

When the recording tape T is to be rewound onto the reel 14 and the recording tape cartridge 10 is to be ejected from the drive device, the positioned state of the recording tape cartridge 10 is released, and the recording tape cartridge 10 is moved in the opposite direction of the direction of arrow A by an unillustrated ejecting mechanism. Then, the door 50 is rotated by the urging force of the coil spring 56 in the direction in which the door 50 closes off the opening 20 while the tongue portions 51 are guided by the guide wall portions 42. Then, the leading end portion of the door 50 enters the guide wall portions 41, whereby the opening 20 is completed closed off and returns to its initial state.

Next, the action of the holding structure 70 that holds the IC tag 100 that stores various information (e.g., inventory managing means such as individual uniform management of the recording tape cartridge 10) separately from the memory board M will be described. In the manufacturing process of the recording tape cartridge 10, the IC tag 100 is supplied to the lower case 18 by a robot hand or the like, for example. The holding structure 70 that is capable of housing the IC tag 100 is formed on the lower case 18, so the IC tag 100 is accurately disposed in a predetermined position inside the case 12.

That is, this holding structure 70 is configured by the holding wall 72 that is configured to have substantially the same curvature as that of the play regulating wall 28 and is formed the predetermined (configured to have the width D that is slightly larger than the thickness of the IC tag 100) space S away from the play regulating wall 28 on the radial direction outer side of the play regulating wall 28, so the holding structure 70 can be taken relatively large (long) without interfering with other parts inside the case 12. Consequently, even the IC tag 100 that has the certain length (area) L can be housed and disposed in an upright state (without being adhered to the play regulating wall 28 and the holding wall 72) between the play regulating wall 28 and the holding wall 72 (inside the space S). It will be noted that this holding structure 70 may also be formed on a curve with a planar view substantially circular arc shape that has substantially the same center as that of the play regulating wall 28, so as to be a certain distance away from the play regulating wall 28 on the radial direction outer side of the play regulating wall 28.

In other words, thus, an attachment region for the IC tag 100 can be ensured inside the case 12. Moreover, the height of this holding wall 72 is formed a predetermined amount lower than the height of the play regulating wall 28, so inserting (putting in) the IC tag 100 along the play regulating wall 28 can be done easily. Consequently, the IC tag 100 can be easily inserted into (put into) and disposed inside the space S by a robot hand or the like.

Further, the recessed portion 74 that receives the IC portion 104 is formed in the holding wall 72, so even the IC tag 100 where the IC portion 104 projects from the surface of the base material 102 can be disposed inside the space S. It will be noted that, when the height (depth) and the left-right direction width of the recessed portion 74 are defined such that the IC portion 104 is housed substantially without a gap in the recessed portion 74, it becomes possible to further position the IC tag 100 in the up-down direction and in the left-right direction inside the space S, so this is preferable.

Further, of the connecting ribs 66 and 68 of the upper case 16, the step portion 68A of the predetermined size is formed on the front side of the connecting rib 68 that is disposed above the holding wall 72, so when the upper case 16 has been joined together with the lower case 18, the connecting rib 68 does not contact the IC tag 100 and the holding wall 72 because of that step portion 68A. In other words, the vertical (height) direction position of the IC tag 100 can be regulated by the connecting rib 68 without causing damage to the IC tag 100.

Additionally, the longitudinal direction (circumferential direction of the play regulating wall 28) end portions of the IC tag 100 are respectively regulated by the connecting rib 66 and the spring locking portion 55, so the longitudinal direction position of the IC tag 100 is also regulated. In other words, thus, the tag 100 is positioned to a certain extent and disposed in a predetermined position inside the case 12, so it can be made difficult for reading errors and writing errors to occur in the reading and writing device that accesses the IC tag 100 from the rear surface side of the case 12 and reads or writes information.

Figure 9:
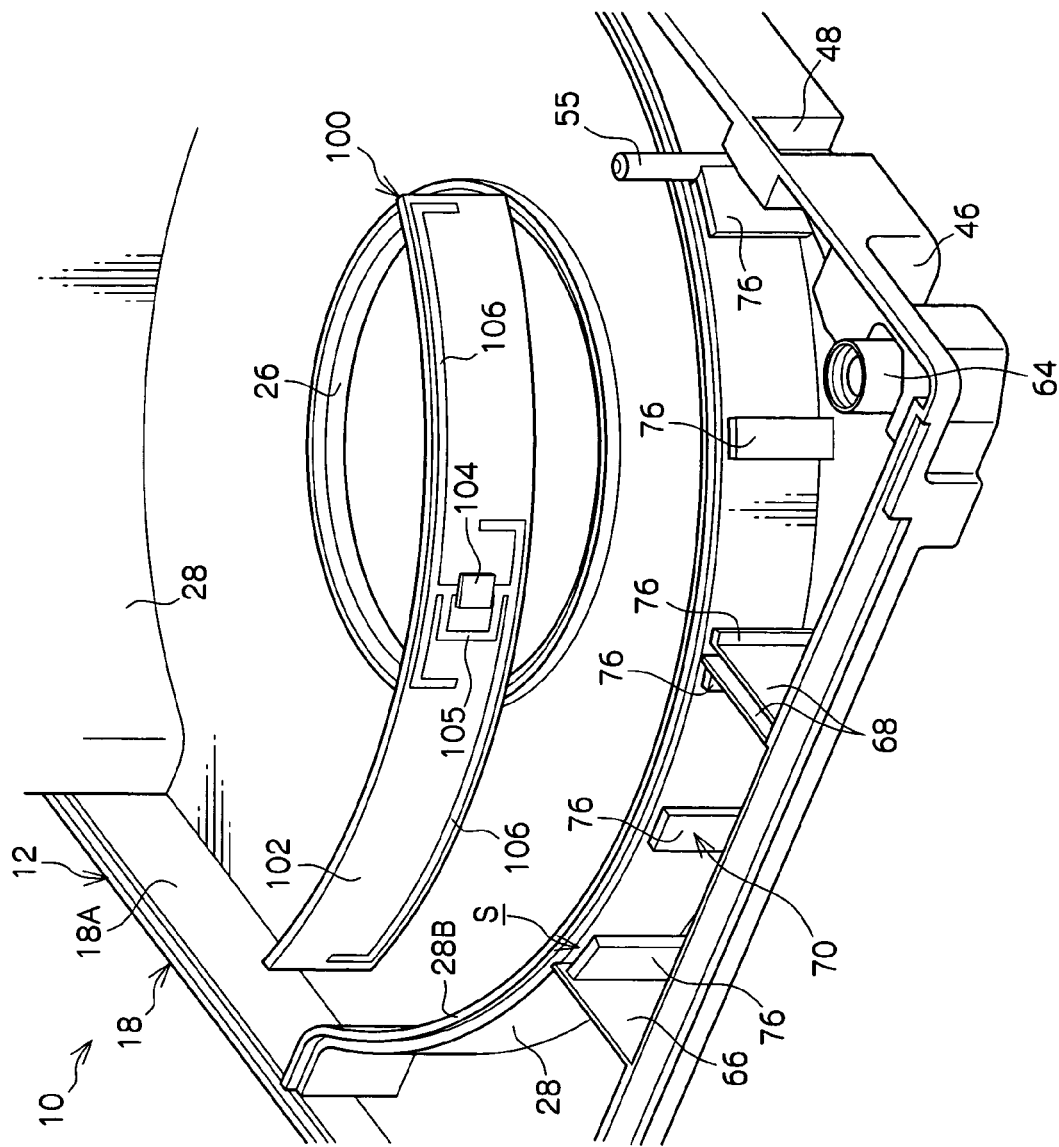
FIG. 9 is a general perspective view showing another holding structure before the IC tag is housed therein.
Figure 10:
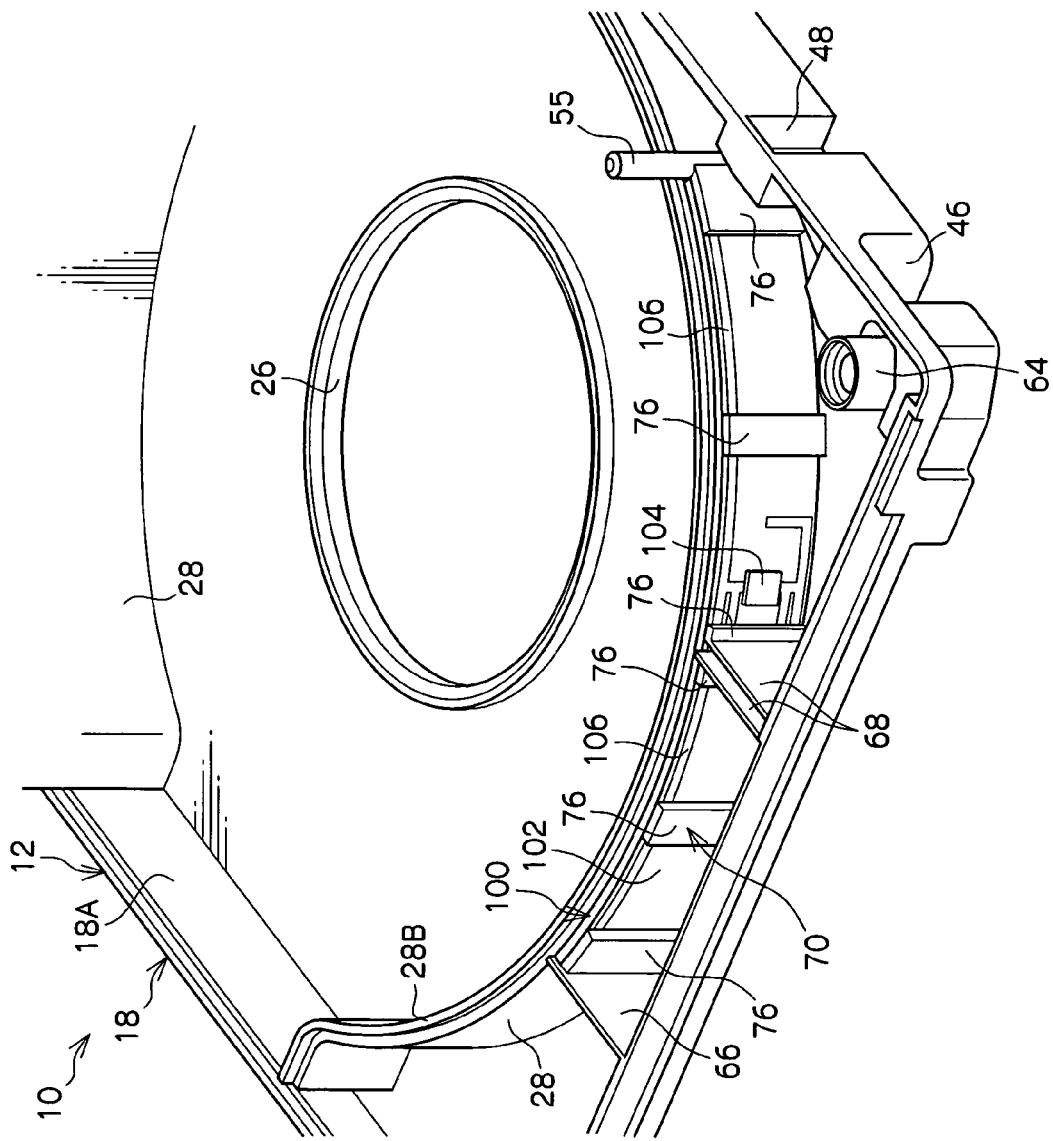
FIG. 10 is a general perspective view showing the other holding structure after the IC tag has been housed therein.

It will be noted that the holding wall 72 may also be given the configuration shown in FIG. 9 and FIG. 10. That is, the holding wall 72 may also be configured by plural (five in FIG. 9 and in FIG. 10) holding ribs 76 that are formed a predetermined distance apart from each other on a circumference that is configured to have substantially the same curvature as that of the play regulating wall 28. According to this configuration, the IC tag 100 can be disposed along the play regulating wall 28, and the wall portion (resin material) that blocks the antenna portions 106 is reduced, so the communication performance resulting from the reading and writing device can be improved (the communication distance can be extended).

Further, a height H of the holding ribs 76 is also configured to be equal to or greater than ½ of the height E of the IC tag 100 (the base material 102) and is configured to be a height that is a predetermined amount lower than the height of the play regulating wall 28. Thus, it can be ensured that the IC tag 100 does not come off of the holding ribs 76, and it can be made easier for the IC tag 100 to be inserted, along the play regulating wall 28, into (put into) the inside of the space S between the play regulating wall 28 and the holding ribs 76 by a robot hand or the like.

Further, when the holding wall 72 is configured in this manner by the plural holding ribs 76 that are disposed upright a predetermined distance apart from each other (e.g., equidistantly), it is desirable for the holding wall 72 to be configured such that the holding ribs 76 are present at least in sites where the connecting rib 66, the spring locking portion 55 and the connecting rib 68 are disposed. According to this configuration, the rigidity of the holding wall 72 that is configured by the holding ribs 76 can be ensured, and the IC tag 100 can be positioned (along the play regulating wall 28). It will be noted that, when a holding rib 76 is disposed at the connecting rib 68, it is desirable in terms of strength to give the connecting rib 68 a double configuration (a configuration where two of the connecting ribs 68 are disposed next to each other) as is shown, for example, and to form holding ribs 76 that extend in substantially left and right opposite directions from each other on each of the leading end portions of the connecting ribs 68 on the front side of the case 12.

Further, in FIG. 9 and FIG. 10, there is shown an embodiment where the play regulating wall 28 is formed in the same height up and down. For that reason, the height E of the IC tag 100 shown in FIG. 9 and FIG. 10 is formed lower than the height E of the IC tag 100 shown in FIG. 2 to FIG. 8. In this manner, the shape (size) of the IC tag 100 is appropriately design-alterable in response to the heights and the like of the play regulating wall 28 and the holding wall 72 (the holding ribs 76). Further, when the holding wall 72 is configured by the holding ribs 76, it is preferable from the standpoint of providing the same effect as that of the recessed portion 74 to set the distance between each of the holding ribs 76 such that the IC portion 104 is disposed between a holding rib 76 and a holding rib 76.

As described above, according to the holding structure 70 pertaining to the present embodiment, the IC tag 100 can be easily attached with good positional accuracy inside the case 12. That is, the IC tag 100 is attached as result of being inserted into (put into) the inside of the space S between the play regulating wall 28 and the holding wall 72 (the holding ribs 76), and the IC tag 100 is not adhered to the play regulating wall 28 or the holding wall 72, so the IC tag 100 can be attached even by a robot hand or the like, and the attachability of the IC tag 100 can be improved.

Further, it is desirable for the IC tag 100 to be given a configuration where the IC tag 100 is accessed from the back label side (the rear surface side of the case 12), so it is desirable for the IC tag 100 to be attached to the rear portion side of the case 12, but according to the holding structure 70 pertaining to the present embodiment, that can be realized easily. That is, according to the holding structure 70 pertaining to the present embodiment, an attachment region for the IC tag 100 can be ensured such that the IC tag 100 can be accessed from the rear label side (the rear surface side of the case 12).

Further, thus, the communication distance accuracy of the reading and writing device with respect to the IC tag 100 can be improved, so radio waves (UHF band) transmitted from that reading and writing device can be stably received by the entire antenna portions of the IC tag 100. Thus, reading accuracy and writing accuracy can be improved, and it can be ensured that reading errors and writing errors do not occur.

It will be noted that, in terms of ensuring a region for the antenna portions 106, it is desirable for the height (area) E of the IC tag 100 to be as high (wide) as possible. Consequently, as shown in FIG. 2 to FIG. 7, it is desirable to make the play regulating wall 28 of the lower case 18 that supports the IC tag 100 high and, in correspondence to that amount, to form the play regulating wall 28 of the upper case 16 low. In any event, this recording tape cartridge 10 can be discriminated from other recording tape cartridges because it houses the IC tag 100.

Further, the recording tape cartridge 10 pertaining to the present embodiment is not limited to the recording tape cartridge that is shown in the drawings and is appropriately design-alterable within a range that does not depart from the gist of the present invention. For example, it suffices for the play regulating wall 28 to be formed at least on the lower case 18, and the play regulating wall 28 does not have to be formed on the upper case 16. Further, although the recording tape cartridge 10 of the preceding embodiment is given a configuration that includes the leader pin 22 as a leader member, the recording tape cartridge 10 may also be given a configuration that includes an unillustrated leader tape or leader block.

Further, the RFID (IC tag 100) may also be a type with respect to which the reading and writing of information are not performed (a type that does not have the function of storing information). That is, the RFID may also be a type that returns radio waves of a specific frequency when it receives radio waves of a predetermined frequency (e.g., 2.45 GHz), for example. In the case of this type of RFID (IC tag 100), the communication distance thereof becomes equal to or less than 1.5 m, for example, but the antenna portions 106 can be made compact.

Further, the door 50 is not limited to a door that slides in a substantially circular arc shape when seen in a plan view and may also be a door that slides in a linear shape, for example. Moreover, it suffices for the recording tape T to be understood as an elongate tape-like information recording and reproducing medium on which information is capable of being recorded and from which information that has been recorded is capable of being reproduced, and it goes without saying that the recording tape cartridge 10 is also applicable to recording tape T of all kinds of recording and reproducing formats.

What is claimed is:

1. A recording tape cartridge comprising:
   a case that has an upper case and a lower case and houses a reel around which recording tape is wound;
   a regulating wall that is formed at least on the lower case and defines an area in which the reel is housed;
   a holding wall that is formed a predetermined space away from an outer peripheral surface of the regulating wall; and
   a radio frequency identification or RFID that is housed in the space between the regulating wall and the holding wall,
   wherein the regulating wall is formed in a substantially circular arc shape in a planar view, and the holding wall is configured by plural ribs that are formed on a circumference that is configured to have substantially the same curvature as that of the regulating wall.

2. The recording tape cartridge of claim 1, wherein a receiving portion that receives of the RFID is formed in the holding wall.

3. The recording tape cartridge of claim 2, wherein the receiving portion includes a recessed portion that is formed in the holding wall.)

4. The recording tape cartridge of claim 2, wherein the receiving portion includes a notch that is formed in the holding wall.)

5. The recording tape cartridge of claim 2, wherein the receiving portion is positioned between the plural ribs.

6. The recording tape cartridge of claim 1, wherein the height of the holding wall is lower than the height of the regulating wall.

7. The recording tape cartridge of claim 1, wherein the RFID includes a substantially rectangular, flexible, thin plate-shaped base material and an IC chip that is disposed on the base material, and a long side of the RFID is disposed along the outer peripheral surface of the regulating wall.

8. The recording tape cartridge of claim 1, wherein the regulating wall and the holding wall of the lower case connect to a rib that extends from an inner surface of a rear wall of the lower case in a direction in which the recording tape cartridge is loaded into a drive device.

9. The recording tape cartridge of claim 1, wherein a regulating wall that defines the area in which the reel is housed is formed on the upper case, the regulating wall of the upper case connects to a rib that extends from an inner surface of a rear wall of the upper case in a direction in which the recording tape cartridge is loaded into a drive device, and a step is formed, so as to be capable of receiving the holding wall, in a site where the rib of the upper case is joined together with the regulating wall.

10. The recording tape cartridge of claim 1, wherein the RFID is attached to the case so as to be positioned on a rear end side of the case in a direction in which the recording tape cartridge is loaded into a drive device.

11. The recording tape cartridge of claim 1, wherein the regulating wall is formed in a planar view substantially circular arc shape, and the holding wall is formed on a curve with a planar view substantially circular arc shape that has substantially the same center as that of the regulating wall.

12. The recording tape cartridge of claim 1, wherein the regulating wall and the holding wall are respectively provided upright from an inner surface of the case, and wherein the RFID has a thin film shape and is held so as to be upright between the regulating wall and the holding wall.

13. The recording tape cartridge of claim 1, wherein a radial direction width of the space is configured to be slightly larger than a thickness of the RFID, and wherein the space has a size operative to hold the RFID in an upright state.

* * * * *